United States Patent [19]

Politte

[11] 4,028,969

[45] June 14, 1977

[54] ADJUSTABLE WRENCH

[76] Inventor: Roscoe J. Politte, 2422 Shady Drive, Arnold, Mo. 63010

[22] Filed: Oct. 8, 1974

[21] Appl. No.: 513,099

Related U.S. Application Data

[63] Continuation of Ser. No. 324,536, Jan. 17, 1973, abandoned, which is a continuation of Ser. No. 112,697, March 30, 1971, abandoned.

[52] U.S. Cl. .................................. 81/146; 267/163

[51] Int. Cl.² ........................ B25B 13/24; F16F 1/18

[58] Field of Search .............. 8/129, 146, 147, 150, 8/151; 267/158, 163

[56] References Cited

UNITED STATES PATENTS

| | | | |
|---|---|---|---|
| 1,540,642 | 6/1925 | Long | 81/147 |
| 1,657,965 | 1/1928 | Haggerty | 81/129 |
| 2,502,407 | 3/1950 | Gordon | 81/146 |

FOREIGN PATENTS OR APPLICATIONS

| | | | |
|---|---|---|---|
| 960,447 | 4/1950 | France | 81/146 |

*Primary Examiner*—Al Lawrence Smith
*Assistant Examiner*—James G. Smith

*Attorney, Agent, or Firm*—Paul M. Denk

[57] ABSTRACT

In a wrench for use in gripping particular workpieces or hardware, such as nuts, pipe, or the like, a handle means has formed at its upward end a fixed jaw, a movable jaw slidably mounts to the shank portion of the handle means for the purpose of adjusting the setting of the wrench. The gripping surfaces of both the fixed jaw and movable jaw are arranged substantially parallel in alignment, and each of said surfaces is arranged at an acute angle of less than 90° with the handle means of said wrench. The movable portion of the wrench is provided with a series of teeth or serrations that are disposed for engaging oppositely disposed teeth formed on the inner surface of the shank portion of the wrench handle, and in this manner the movable jaw may be fixed in a particular setting for gripping a particular workpiece to be manipulated. A leaf spring provided intermediate the outer surface of the shank and the contiguous surface of the movable jaw normally biases the aforesaid sets of series of teeth together, but by the exertion of force upon the back side of the movable jaw the teeth may be disengaged for allowing for the slidable movement of said jaw.

1 Claim, 7 Drawing Figures

FIG. 1
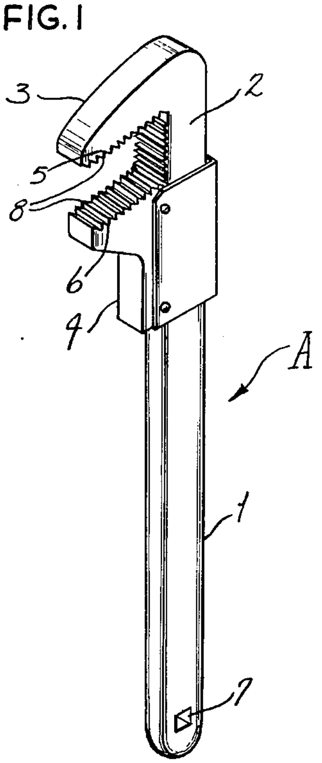
FIG. 2
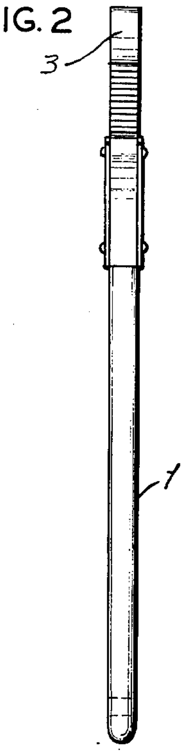
FIG. 3
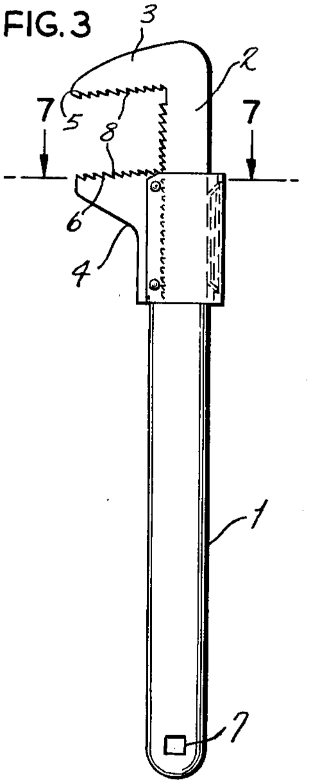
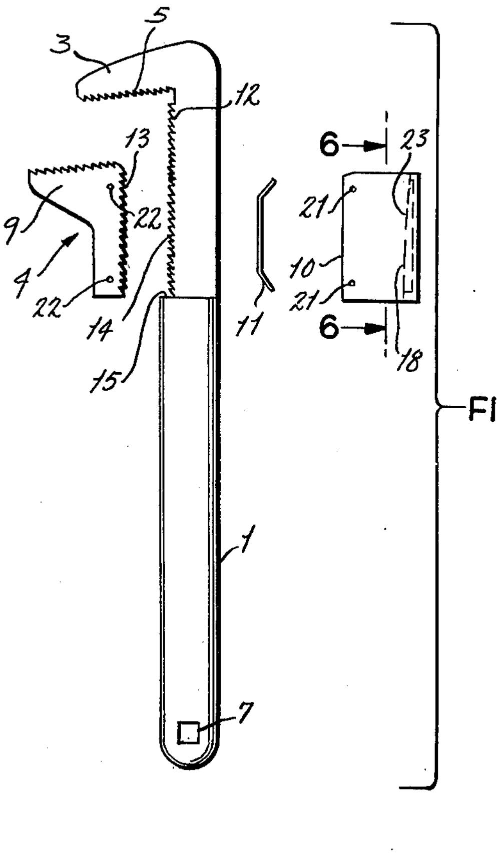
FIG. 4
FIG. 5
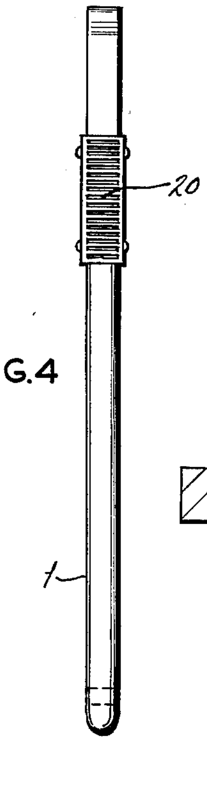
FIG. 6
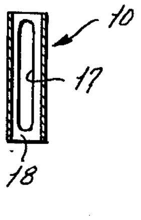
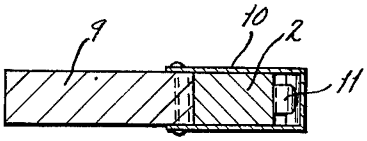
FIG. 7

ADJUSTABLE WRENCH

CROSS-REFERENCE TO RELATED APPLICATION

The subject matter of this application is related to and comprises a continuation of the application of Roscoe J. Politte, Ser. No. 324,536, filed on Jan. 17, 1973, now abandoned and which application comprises a continuation of Ser. No. 112,697, now abandoned, filed on Mar. 30, 1971, the claim to priority being made with respect to both of these prior applications.

BACKGROUND OF THE INVENTION

This invention generally relates to an adjustable wrench, but more particularly pertains to an adjustable wrench having both fixed and movable jaws that are arranged at an acute angle with the wrench handle means so as to facilitate its grasping and retention upon a workpiece or component being worked.

Various types of lock wrenches have been devised in the prior art which incorporate both a fixed jaw that is usually integrally formed with the handle portion of the wrench, while a movable jaw slidably mounts to the shank portion of the wrench and can be adjusted in its setting with respect to said fixed jaw, the movable jaw normally being held in place by means of a series of serrations or teeth formed both on the wrench shank and the contiguous surface of the movable jaw. Then, when it is desired to adjust the setting of the movable jaw, the back side of said jaw may be compressed inwardly against the bias of a spring to disengage the aforesaid constraining teeth, thereby allowing this jaw to be shifted along the length of the wrench shank and into a new setting. Prior art of this nature is shown in the early U.S. Pat. to Toohey, No. 751,821. In addition, some thought has been given towards the angulation of the teeth of the jaw for the purpose of facilitating its gripping of the component to be worked. For example, in the U.S. Pat. to Myers, No. 3,636,800, the jaws, both fixed and movable, are shown arranged at an obtuse angle with respect to the wrench handle, and are serrated to facilitate their grasping of a component, such as a pipe joint, or the like, as described.

The present invention is designed to improve upon any of these forms of pipe wrenches shown, and particularly in that it has been found that by angulating the movable and fixed jaws of the wrench at an acute angle, or less than 90°, with respect to the wrench shank, much greater in grasping ability is exhibited by the tool in retaining the component being worked, without slipping therefrom.

In view of the foregoing, one of the objects of this invention is to provide an adjustable wrench in which its jaws are angulated in a manner which facilitates and enhances their retention to a workpiece.

Another object of this invention is to provide an adjustable wrench which can be quickly reset to various settings to expedite its usage.

An additional object of this invention is to provide a wrench assembly with a built-in cam like gripping feature that allows the jaw teeth to tightly grasp the workpiece upon application.

Another object of this invention is to provide a wrench assembly which is simple to manufacture, economical, and effective in usage.

Other objects will become more apparent to those skilled in the art in the light of the following summary, and particularly through the description of the preferred embodiment when reviewed in view of the accompanying drawings.

SUMMARY OF THE INVENTION

In accordance with this invention, there is generally provided an adjustable wrench which may be easily manipulated and adjusted through the exertion of a small quantity of thumb pressure or force on the part of its user. The wrench incorporates a handle means, that includes a shank portion, and at the upper portion of the shank there is integrally connected a fixed jaw that incorporates a component gripping surface. A movable jaw is slidably mounted upon the shank portion of the wrench, and said movable jaw also includes a workpiece gripping surface which in cooperation with a similar surface upon the fixed jaw can be urged into contact for gripping the part to be manipulated. Both the fixed and movable jaws, and in particularly their gripping surfaces, are arranged in substantially parallel alignment, forming an acute angle, or an angle of less than 90°, with the shank portion and handle means of this adjustable wrench. As previously described, the movable jaw portion is slidably mounted upon the shank portion of the wrench handle, and it can be adjusted and fixed in position with respect to said shank through the intermeshing of a series of serrations or teeth provided upon the backside of the jaw portion of this movable jaw that cooperate with similar serrations or a series of teeth provided upon the frontal surface of the shank portion of the handle. Intermediate the backside of the shank portion of the wrench handle and the other or opposite surface of the opening through the movable jaw is a leaf spring which is designed to urge these two surfaces apart, thereby continuously urging the aforesaid sets of series of teeth into constant locking engagement, only to be disengaged upon the exertion of some force, as through the use of thumb pressure, against the backside of said movable jaw for the purpose of disengaging said teeth, and thereby allowing the movable jaw to be shifted along the length of the shank either to provide for greater opening, or for its coming into closer contact with the gripping surface of the fixed jaw as when it is desired to embrace a workpiece.

BRIEF DESCRIPTION OF THE DRAWINGS

In the drawings,

FIG. 1 provides an isometric view of the adjustable wrench of this invention;

FIG. 2 provides a back view of the adjustable wrench;

FIG. 3 provides a side view of the adjustable wrench;

FIG. 4 provides an exloded view of the side of the adjustable wrench showing its various operating components;

FIG. 5 provides a back view of the adjustable wrench;

FIG. 6 provides a sectional view of the channel portion of the movable jaw taken along the line 6—6 of FIG. 4; and FIG. 7 provides a sectional view of the wrench assembly taken along the line 7—7 of FIG. 3.

DESCRIPTION OF THE PREFERRED EMBODIMENT

In the drawings, and particularly in FIG. 1, there is shown the adjustable wrench A of this invention comprising a handle means 1 which has integrally formed thereabove a shank portion 2, and to the upper end of this shank portion there is further integrally formed a fixed jaw 3. Slidably mounted upon the shank portion 2 of the wrench is a movable jaw 4, with said shank extending through an opening provided in said jaw, and depending upon the direction of slide and adjustment of this movable jaw, either towards or away from the fixed jaw 3, various sized workpieces may be embraced by the gripping surfaces 5 and 6 of each respective jaw and worked upon accordingly. Normally, a wrench of approximately ten inch size in overall length may have jaws that separate approximately an inch to an inch and one quarter for accommodating a workpiece of that approximate size, but obviously through adjustment of the movable jaw 4 smaller workpieces may also be gripped and manipulated through the use of this wrench.

Provided through the approximate downward portion of the handle means is an aperture 7 which is useful for accommodating the suspension of the wrench as when hung upon some means to provide for its storage, as when not in use. Furthermore, the handle means 1 may have rounded corners, being somewhat oval in cross section, so as to provide for ease of its gripping as when the adjustable wrench is being utilized. Obviously, other forms of shapes for the handle means may be provided, as for example one which provides finger grips upon its frontal surface to facilitate grasping and usage of said wrench. What is shown in these drawings is one embodiment for illustration purposes.

To further enhance the efficiency of use of this adjustable wrench, each gripping surface 5 and 6 is provided with a series of serrations, as shown at 8, and which may be slightly angulated so as to enhance the gripping attributes of these jaws. Since a wrench of this nature is usually pivoted when in use urging its handle forwardly, to enhance its gripping ability, the serrations on the jaw 3 are angulated towards the shank 2, while the serrations on the jaw 4 are angulated away from said shank. It is also significant that the jaws 3 and 4, and particularly their parallely aligned gripping surfaces 5 and 6, are angulated at an acute angle with respect to the handle means and shank portion of this wrench, being arranged at less than 90° therewith, and preferably will be manufactured at an angle of approximately 88° with said handle portion. It has been found, through experimentation, that this slight acute angulation actually enhances the ability of the wrench to grip and adhere to a workpiece being manipulated, and through the cooperative efforts of the serrations 8 provided upon these gripping surfaces, the wrench is more effectively held to the workpiece and will not slip off as when it is being urged in turning moment.

FIGS. 2, 3 and 5 show other side, front, and back views of the wrench disclosed in FIG. 1, and show the various relationship of the component parts of the wrench as previously described.

In FIG. 4, there is shown an exploded view of the wrench assembly of this invention, including the handle means 1, its shank portion 2, and the fixed jaw 3, being integral all as previously described. The movable jaw 4 of this invention, which is herein shown in its separable components, comprises a jaw portion 9, a back channel portion 10, which is normally retained to the jaw portion 9, and a leaf spring 11 which cooperates within the channel portion to continuously urge the movable jaw 4, and more particularly its jaw portion 9, into contact with the frontal surface 12 of the shank 2 of the wrench.

The jaw portion 9 of the movable jaw of the wrench includes upon its backside a series of serrations, or teeth, as shown at 13, and these teeth are disposed for cooperating with similar type teeth, as at 14, formed upon said front surface 12 of the wrench shank 2. These serrations 14 extend downwardly approximately to the vicinity of a shoulder 15 formed upon the handle means 1, which shoulder portion is designed for contact with the bottom 16 of the jaw portion 9 so as to limit its downward movement, while the upper limit of the series of teeth 14 extend just below the gripping surface 5 of the fixed jaw 3. It should be noted that the teeth 13 provided upon the jaw portion 9 are angulated somewhat downwardly, while the series of teeth 14 provided upon the shank 2 are angulated upwardly, and hence, while the teeth are engaged, the movable jaw 4 will be restricted from further downward movement, but on the other hand, through the exertion of force can be slide upwardly into proximity with the fixed jaw 3. The movable jaw 4, and more particularly its series of teeth 13, are continuously urged into contact with the teeth 14 of the shank 2. This is achieved through the use of a leaf spring 11 that is loosely seated within a slot 17 milled into the interior surface 18 of the back of the channel member 10, and with the resilient spread of the spring 11 being greater than the width between the back side 19 of the wrench shank and the channel surface 18 of the portion 10, the spring will continuously urge the movable jaw 4 rearwardly, normally maintaining the intermeshing of the series of teeth 13 and 14. Then, when it is desired to lower or raise the movable jaw 4 upon the shank, some pressure may be exerted against the backside of the channel portion 10 to push the movable jaw forwardly, thereby disengaging the series of teeth 13 and 14, at which time the movable jaw may then be urged upwardly or downwardly for resetting as desired. Any thumb pressure exerted upon the backside of the channel member 10 forces a compression against the resiliency of the leaf spring 11, thereby allowing the movable jaw 4 to be urged forwardly, as aforesaid. Also, instead of supplying a slot 17 in the channel 10 for embracing the leaf spring, it is just as likely that said spring could be rivited or otherwise permanently fastened to the channel surface 18 and function just as effectively.

It should be noted that the backside of the channel 10 is provided with a knurled or grooved surface 20, which allows the thumb to frictionally hold to this portion of the movable jaw while it is being shifted. Furthermore, there are a series of apertures, as at 21, provided through the channel portion 9, and are adapted for alignment with similar apertures, as at 22, which later apertures are provided through the portion 9, and may be threaded through these series of apertures 21 and 22 various types of fasteners such as Allen screws, rivets, or the like, may be inserted and retained for the holding the two components of the movable jaw 4 together upon the shank portion 2 of this wrench assembly. When the movable jaw 4 has been assembled in this manner, it can be seen that the combination of the jaw portion 9 and the channel portion 10 provide an opening therethrough in which the shank portion 2 of the wrench is slidably retained, and in this manner the movable jaw 4 may be forcefully urged into sliding adjustment upon said shank as when it is desired to readjust the dimension between the jaw surfaces 5 and 6 for accommodating a workpiece, like nut, bolt, pipe, or other component of varying size.

When this adjustable wrench is to be utilized as a pipe wrench, then, as is known in the art, it is desirable to include provision for slight angular play between the normally parallel alignment of the gripping surfaces 5 and 6, usually such play being built into the movable jaw of the wrench. In this particular instance, it is to be noted that the inner surface 18 of the channel portion 10 tapers as it extends upwardly, as at 23, and this provides tolerance for slight pivotal movement of the upper part of the jaw portion 9 slightly away from the shank 2, while the lower teeth 13 still intermesh with the teeth 14 of said shank. A thumb force exerted upon the upper part of the channel portion 10 urges and pivots the upper part of the movable jaw 9 forwardly, moving its gripping surface 6 slightly out of its normally parallel alignment with the surface 5. Hence, when a pipe is disposed within the gripping spacing intermediate the jaws 3 and 4, this slight amount of jaw play or pivot allows the pipe to become wedged snugly between the serrations 8 of the jaw surfaces 5 and 6, providing for a tight gripping of the embraced pipe when a torque force is applied to the wrench.

Numerous variations in the construction of this wrench assembly may occur to those skilled in the art in the light of the previous disclosure. Any such variations, if they are made obvious to those skilled through the disclosure of this preferred embodiment, are intended and desired to be protected by any claims to patent protection issuing upon this invention. The description of the preferred embodiment is for purposes of illustration, and not for means of limitation.

I claim:

1. An adjustable wrench for use in gripping a workpiece comprising a handle means having at one end an acutely inclined fixed jaw angled downwardly towards the handle means and forming an angle of less than 90° therewith, said fixed jaw incorporating a workpiece gripping surface, a movable jaw incorporating a gripping surface and being normally in parallel alignment with the gripping surface of the fixed jaw and being positioned in slidable engagement with said handle means, the gripping surface of both the fixed and movable jaws being serrated to enhance the capability of said wrench for gripping a workpiece, the serrations of the fixed jaw being angled inwardly towards the handle means, the serrations on the movable jaw being angled outwardly, and together said serrated jaws providing cooperating serrations for achieving said enhanced grip, said handle means having a series of teeth formed upon its surface disposed towards the movable jaw, said movable jaw having a series of teeth formed proximate its locations of slidable engagement with the handle means teeth whereby said sets of series of teeth normally intermesh to retain the movable jaw stationary with respect to the fixed jaw and arranged for gripping a workpiece to be manipulated, said movable jaw having a jaw portion and a channel portion joined together and therein providing an opening through which the handle means is slidably disposed, a leaf spring means disposed intermediate the oppositely disposed surfaces of the handle means and the jaw opening for normally maintaining said sets of series of teeth in engagement for thereby fixing the movable jaw with respect to said handle means, the channel portion having a back forming the opposite surface of the jaw opening, said opposite surface of the jaw opening having a milled elongated slot therein and being disposed for loosely seating and retaining the ends of said leaf spring and urging said spring in a biasing relationship against the contiguous surface of the handle means, said back of the movable jaw having a tapering thickness narrowing towards its edge disposed closest to the fixed jaw of the handle means thereby normally providing greater spacing intermediate said opposite surface of the jaw opening and the handle means at this location than the spacing provided intermediate the other end of said surface of said jaw opening and the contiguous handle means, whereby pressure exerted against said movable jaw and against the bias of the leaf spring widens the entrance spacing between the normally parallel fixed and movable jaws gripping surfaces for facilitating their gripping and wedging a workpiece therebetween, and the back side of said movable jaw including a grooved surface to facilitate its adherence as the jaw is being forced towards the handle means and as said jaw is being moved with respect to the fixed jaw.

* * * * *